(12) United States Patent
Chaiken et al.

(10) Patent No.: US 10,936,460 B2
(45) Date of Patent: Mar. 2, 2021

(54) METHOD AND APPARATUS FOR IDENTIFYING AND REPORTING FAULTS AT AN INFORMATION HANDLING SYSTEM

(71) Applicant: DELL PRODUCTS, LP, Round Rock, TX (US)

(72) Inventors: Craig L. Chaiken, Pflugerville, TX (US); Matthew G. Page, Round Rock, TX (US); Michael W. Arms, Pflugerville, TX (US); Dustin A. Combs, Georgetown, TX (US); Chun Yi (Jadis) Yang, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 87 days.

(21) Appl. No.: 16/012,324

(22) Filed: Jun. 19, 2018

(65) Prior Publication Data
US 2019/0384684 A1 Dec. 19, 2019

(51) Int. Cl.
*G06F 11/273* (2006.01)
*G06F 21/64* (2013.01)
*G06F 21/57* (2013.01)
*G06F 11/22* (2006.01)

(52) U.S. Cl.
CPC ........ *G06F 11/273* (2013.01); *G06F 11/2284* (2013.01); *G06F 11/2733* (2013.01); *G06F 21/572* (2013.01); *G06F 21/575* (2013.01); *G06F 21/64* (2013.01); *G06F 11/2273* (2013.01)

(58) Field of Classification Search
None
See application file for complete search history.

(56) References Cited

U.S. PATENT DOCUMENTS

| 6,216,226 | B1 * | 4/2001 | Agha | G06F 11/1417 713/1 |
| 6,470,289 | B1 * | 10/2002 | Peters | G01K 7/42 702/132 |
| 7,500,094 | B2 | 3/2009 | Phelps et al. | |
| 7,810,123 | B1 * | 10/2010 | Prestoy | H04N 7/17354 709/212 |
| 8,341,289 | B2 * | 12/2012 | Hellhake | H04L 61/25 709/238 |
| 8,429,630 | B2 * | 4/2013 | Nickolov | G06F 9/4856 717/110 |
| 2005/0062599 | A1 * | 3/2005 | Neubauer | G05B 23/0272 340/506 |
| 2006/0026560 | A1 * | 2/2006 | Kornerup | G06F 8/34 717/113 |

(Continued)

OTHER PUBLICATIONS

HemantS. "Purple, Brown, Yellow, Orange, Red, Green Screen of Death explained". Sep. 12, 2017.*

(Continued)

*Primary Examiner* — Steve N Nguyen
(74) *Attorney, Agent, or Firm* — Larson Newman, LLP

(57) ABSTRACT

A method includes invoking, by an embedded controller at an information handling system, a test procedure to evaluate functionality of motherboard resources at the information handling system. A result of the test procedure is displayed at a primary display device using a built in self test function incorporated at the primary display device.

20 Claims, 4 Drawing Sheets

(56) References Cited

U.S. PATENT DOCUMENTS

| | | | |
|---|---|---|---|
| 2006/0294349 A1 | 12/2006 | Spottswood | |
| 2007/0094538 A1* | 4/2007 | Kung | G06F 11/2284 714/36 |
| 2007/0168738 A1* | 7/2007 | Wang | G06F 11/2284 714/36 |
| 2008/0141073 A1 | 6/2008 | Shih et al. | |
| 2010/0023741 A1* | 1/2010 | Wang | G06F 11/1004 713/2 |
| 2011/0029132 A1* | 2/2011 | Nemmers | B25J 9/1692 700/254 |
| 2012/0284729 A1* | 11/2012 | Sharda | G06F 9/5094 718/104 |
| 2013/0300567 A1* | 11/2013 | Zou | G06F 11/2284 340/815.45 |
| 2016/0371149 A1* | 12/2016 | Antony | G06F 11/1451 |
| 2019/0147121 A1* | 5/2019 | Chen | G06F 17/504 |

OTHER PUBLICATIONS

Tiwari, Aditya. "Heard of Blue Screen of Death? There Are Black, Red, Green, White, Purple, Gray, Yellow, Brown Also". Aug. 31, 2016.*

* cited by examiner

METHOD AND APPARATUS FOR IDENTIFYING AND REPORTING FAULTS AT AN INFORMATION HANDLING SYSTEM

FIELD OF THE DISCLOSURE

This disclosure generally relates to information handling systems, and more particularly relates to identifying and reporting faults.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system may further support testing and diagnostic protocols that can be administered when an operational failure is encountered.

SUMMARY

A method may include invoking, by an embedded controller at an information handling system, a test procedure to evaluate functionality of motherboard resources at the information handling system. A result of the test procedure can be displayed at a primary display device using a built in self test function incorporated at the primary display device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes a primary printed circuit board, often referred to as a motherboard or a main board. The motherboard typically includes a central processing unit, peripheral and memory interface devices, and the like. Most if not all of the functionality of an information handling system can be provided by components included on the motherboard. Accordingly, a failure of any component or subsystem implemented on the motherboard may render the system inoperable. Furthermore, such a failure may be difficult to diagnose or report because the critical subsystems that are necessary to perform diagnostic or reporting functions may themselves be malfunctioning or not yet initialized. The motherboard also may include an auxiliary processor known as an embedded controller that may operate autonomously with respect to the central processing unit. The embedded controller can be configured to receive and process signals from a keyboard and other switches, turn the system on and off, control operation of a primary display device, and to perform other administrative tasks. The embedded controller is typically operational when power is supplied to the information handling system, even prior to initialization of the central processing unit and other system devices. FIGS. 1-5 illustrate techniques for identifying and reporting faults at an information handling system. In particular, an embedded controller included at a motherboard of an information handling system is configured to administer a test routine to evaluate operation of the motherboard and to utilize a built-in self-test feature provided by a display device to indicate a result of the test routine.

Figure 1:
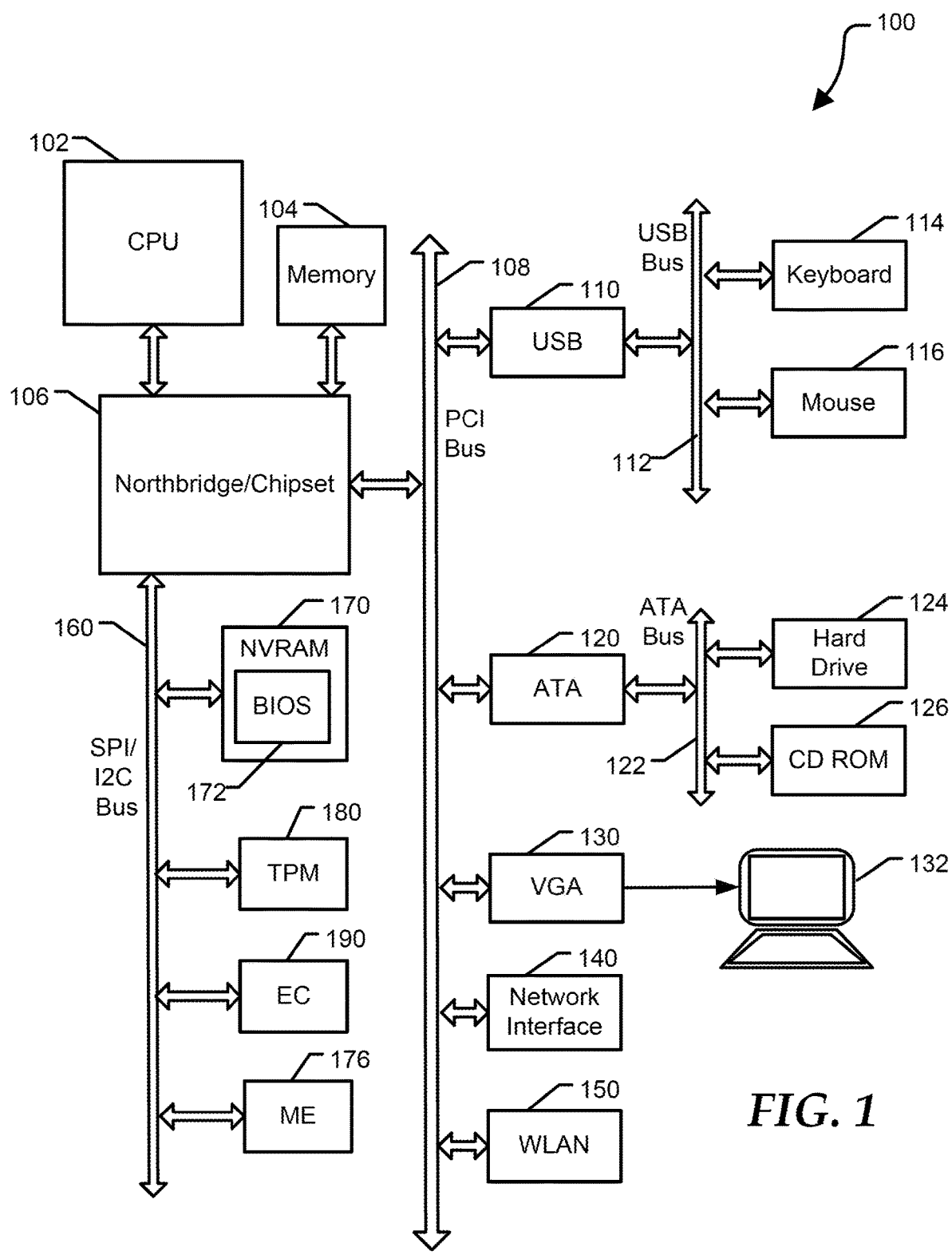
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130 coupled to a primary display device 132, a network interface controller (NIC) 140, a wireless local area network (WLAN) controller 150, a serial peripheral interface (SPI) bus 160, a NVRAM 170 for storing BIOS 172, a trusted platform module (TPM) 180, and an embedded controller (EC) 190. EC 190 is responsible for performing low level hardware tasks including thermal management and power management operations. As disclosed herein, EC 190 is also responsible for performing diagnostic tasks and for providing low level management of primary display device 132. NVRAM 170 can be referred to as a SPI flash storage device, BIOS SPI, and the like. System 100 can further include a management engine (ME) 176. Like EC 190, ME 176 can operate independently of primary CPU core processors, and is responsible for performing the earliest stages of initialization of system 100. For example, ME 176 can be configured to authenticate a first block of BIOS code stored at NVRAM 170 before releasing the x86 processor from reset. Accordingly, ME 176 can provide a hardware root of trust for system 100.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and the like.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100.

As described above, EC 190 has access to various resources provided at a motherboard. In an embodiment, EC 190 can include a memory device for storing one or more software routines configured to evaluate operation of various motherboard resources. For example, EC 190 can utilize a platform environment control interface (PECI) to communicate with a digital thermal sensor included at CPU 102 to determine a temperature of CPU 102. Furthermore, EC 190 can be configured to access firmware stored at NVRAM 170, for example via SPI bus 160, to determine whether the firmware has been corrupted. In addition, EC 190 can initiate a built-in self-test (BIST) routine at primary display device 132, and control operation of a back light included at display device 132. EC 190 can control operation of display device 132 so that a result of the software routines can be represented on the display device.

Figure 2:
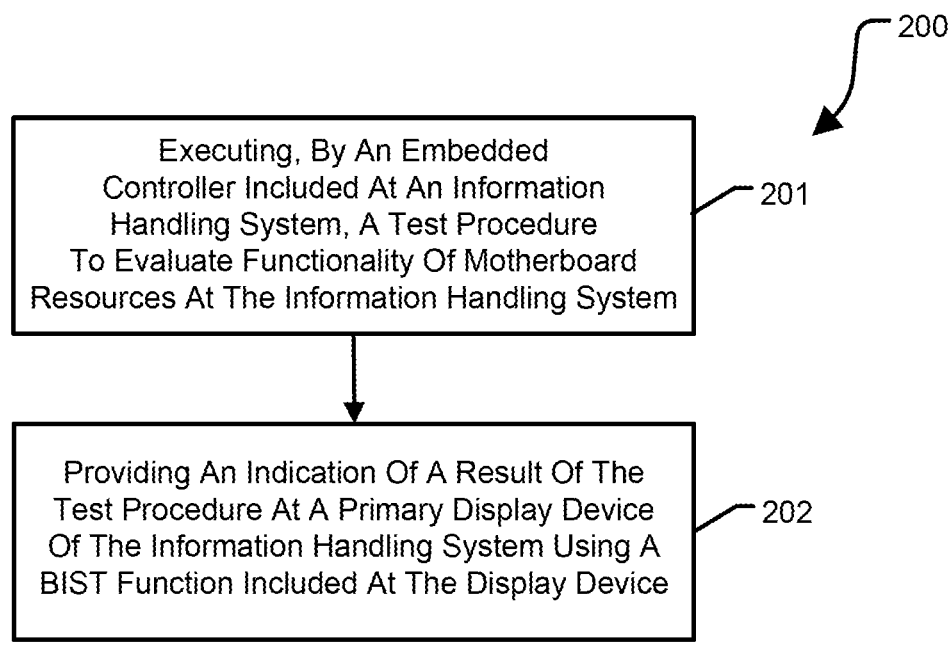
FIG. 2 is a flow diagram illustrating a method for testing an information handling system according to a specific embodiment of the present disclosure.

FIG. 2 show a method 200 for testing information handling system 100 according to a specific embodiment of the present disclosure. Method 200 begins at block 201 where an embedded controller included at an information handling system executes a test procedure to evaluate functionality of motherboard resources at the information handling system. For example, EC 190 can be configured to execute instructions stored at a memory device that is accessible to EC 190. In an embodiment, the test procedure can be enabled in response to detecting that a particular keyboard key has been pressed during power-on-reset at information handling system 100. In another embodiment, the test procedure can be enabled in response to detecting that information system 100 has failed to properly complete a boot sequence. Method 200 completes at block 202 where an indication of a result of the test procedure is provided at a primary display device of the information handling system using a BIST function included a the display device. The nature of the test procedure and result presentation is described in detail below.

Figure 3:
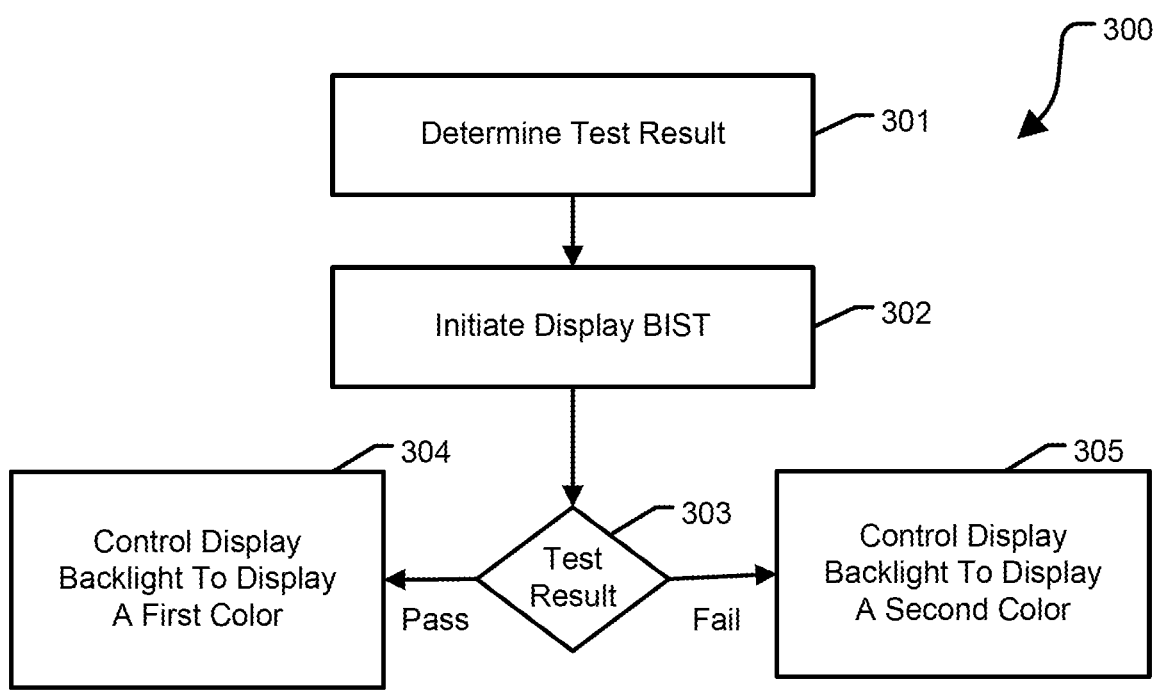
FIG. 3 is a flow diagram illustrating a method for displaying a result of the test procedure of FIG. 2 according to a specific embodiment of the present disclosure.

FIG. 3 shows a method 300 for displaying a result of the test procedure of FIG. 2 according to a specific embodiment of the present disclosure. Method 300 begins at block 301 where a result of the test procedure administered at method 200 is determined. For example, EC 190 can store a result of the test procedure at a memory device accessible to EC 190. Method 300 continues at block 302 where a BIST function at a primary display device is initiated. For example, EC 190 can initiate a BIST function at display device 132 by activating a corresponding test signal at the display device. In an embodiment, the BIST function at primary display device 132 is configured to display a sequence of colors. If the test procedure concludes that the motherboard resources are functional, method 300 transitions from decision block 303 to block 304, where a backlight at display device 132 is controlled so that a first color generated by the BIST routine is displayed. For example, EC 190 can activate the backlight only during an interval corresponding to when the BIST routine is displaying a green color at primary display device 132 to indicate that the test procedure did not identify a failure. If the test procedure concludes that the motherboard resources are not functional, method 300 transitions from decision block 303 to block 305, where a backlight at the primary display device is controlled so that a second color generated by the BIST routine is displayed. For example, EC 190 can activate the backlight only during an interval corresponding to when the BIST routine is displaying a red color at primary display device 132 to indicate that the test procedure did identify a failure.

Figure 4:
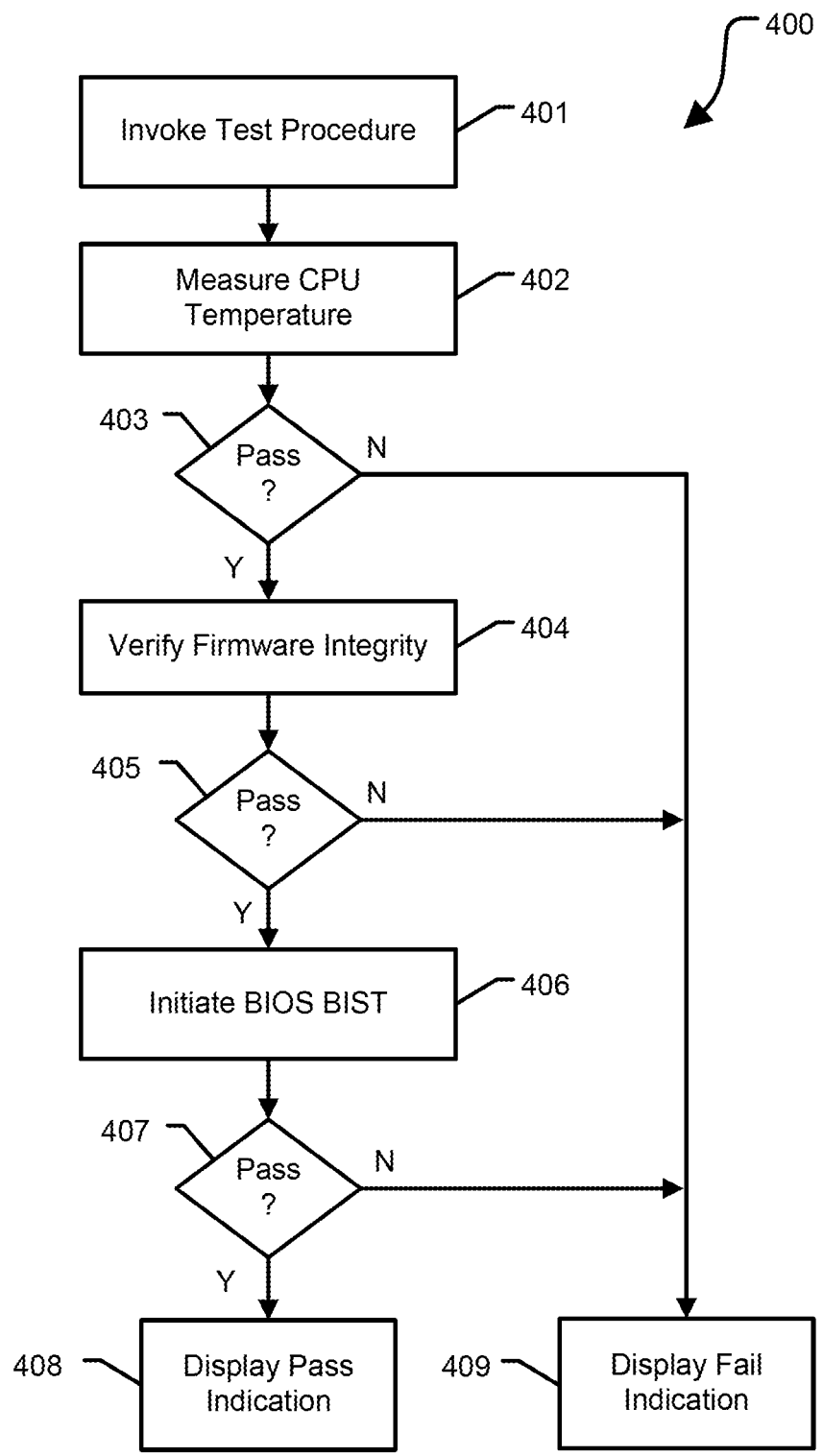
FIG. 4 is a flow diagram illustrating a method for administering a test procedure at an information handling system according to a specific embodiment of the present disclosure.

FIG. 4 shows a method 400 for administering a test procedure at an information handling system 100 according to a specific embodiment of the present disclosure. Method 400 begins at block 401 where a test procedure is invoked at an embedded controller included at an information handling system. The test procedure begins at block 402 where a temperature at a central processing unit is measured. For example, EC 190 can utilize a PECI provided by system 100 to attempt to communicate with CPU 102. In an embodiment, EC 190 can initiate a PECI Ping( ) command, verify that a valid and expected processor identification is received via a PECI PACKAGE_ID, and verify that a processor thermal parameters, for example PECI TEMP_TARGET, are valid. A failure of any of these communication events is indicative of a failure of CPU 102 or of other vital infrastructure provided by the system 100 motherboard. If a failure is detected at block 402, method 400 proceeds from decision block 403 to block 409 where a fail indication is displayed at primary display device 132 using a BIST function provided by device 132. In particular, the motherboard BIST routine can send a pass/fail status to EC 190 using mailbox command, for example using an SPI bus 160.

If a failure is not detected at block 402, method 400 proceeds from decision block 403 to block 404 where the integrity of system firmware is verified. For example, EC 190 can access firmware stored at NVRAM 170 via SPI bus 160. In particular, EC 190 can calculate a checksum of information included at a firmware volume boot block header, a boot block body, a primary firmware volume header, a primary firmware volume body, and the like, and compare the calculated checksum(s) to predetermined values stored at a location accessible to EC 190. If any of the calculated checksums is incorrect, method 400 proceeds from decision block 405 to block 409 where a fail indication is displayed at primary display device 132. One of skill will appreciate that the integrity of one or more portions of firmware at BIOS 172 can be verified using other techniques, for example by generating a hash based on a particular set of firmware instructions and comparing the generated hash to an expected value.

If a failure is not detected at block 404, method 400 proceeds from decision block 405 to block 406 where a BIST provided by BIOS 172 is initiated. For example, after EC 190 completes the tests of blocks 402 and 404, EC 190 can set a boot flag indicating that the next boot at system 100 is motherboard BIST boot, and a boot of information handling system 100 is initiated. Because the boot flag is set, BIOS 172 will invoke the motherboard BIST routine instead of loading a primary operating system. In an embodiment, a motherboard BIST routine can attempt to verify the presence and operability of various motherboard resources, such as TPM 180, PCI peripherals coupled to PCI bus 108, memory 104, and the like. The motherboard BIST routine can verify the functionality of these motherboard resources independent of whether particular devices are enabled or disabled at a BIOS configuration setup interface. If a failure is detected at block 406, method 400 proceeds from decision block 407 to block 409 where a fail indication is displayed at primary display device 132 using a BIST function provided by device 132. If a failure is not detected at block 406, method 400 proceeds from decision block 407 to block 408 where a pass indication is displayed at primary display device 132 using the BIST function provided by device 132.

Figure 5:
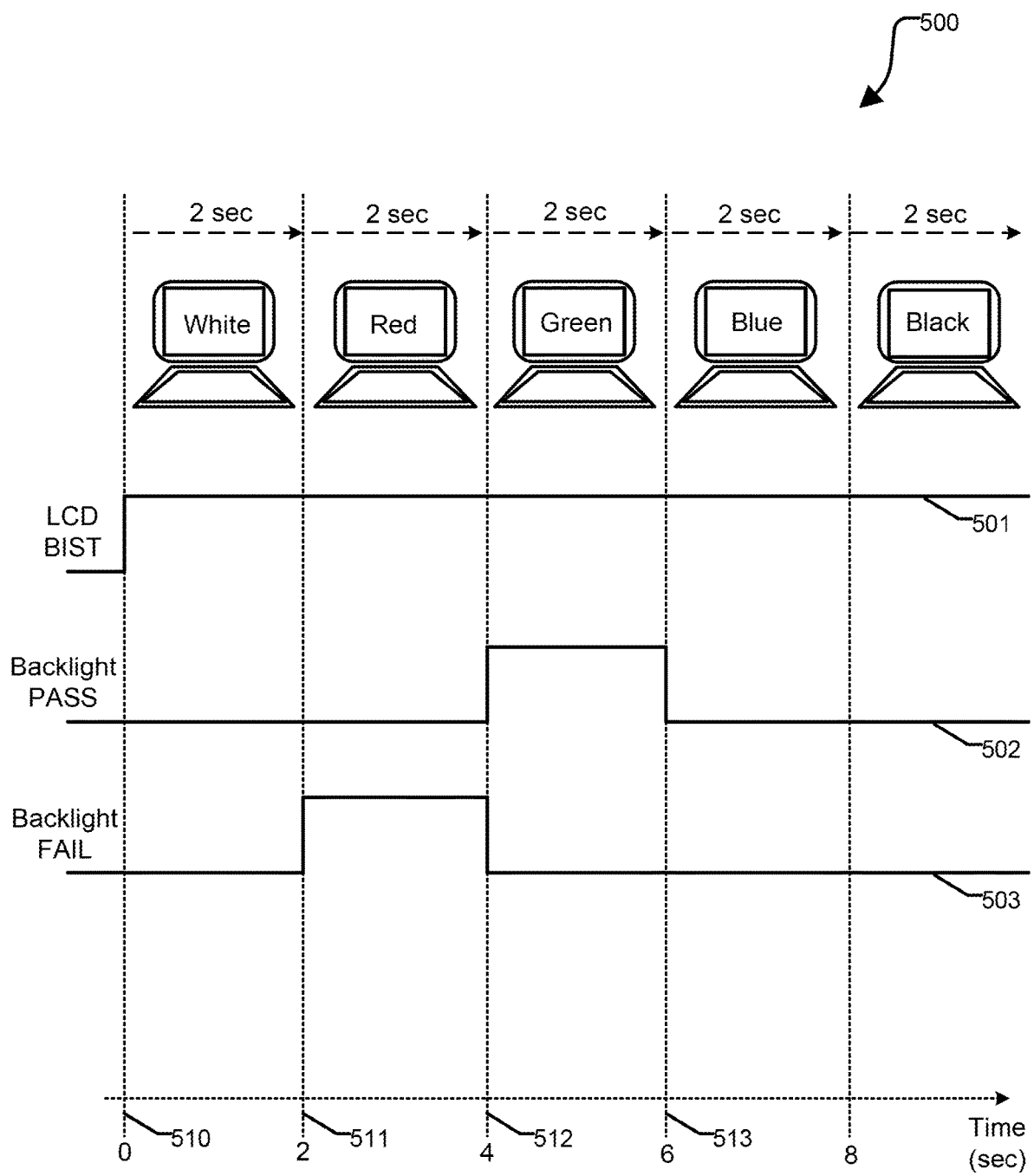
FIG. 5 is a timing diagram illustrating controlling a primary display device to indicate a result of a motherboard test procedure according to a specific embodiment of the present disclosure.

FIG. 5 shows a timing diagram 500 illustrating how to control a primary display device to indicate a result of a motherboard test procedure according to a specific embodiment of the present disclosure. Timing diagram 500 includes a horizontal axis representing time and a vertical axis representing voltage. At time reference 510, signal LCD BIST 501 is asserted, which causes the primary display device at an information handling system to begin a BIST routine. In particular, the BIST routine causes the display device to display a sequence of colors. For example, the display device can display each of white, red, green, blue, and black, displaying each color for two seconds. Under normal operating conditions, a backlight included at the display device would be activated throughout the duration of the BIST color sequence so that all colors are visible. In an embodiment, the backlight is conditionally asserted based on a result of a motherboard test routine. For example, in order to indicate that the motherboard test procedure completed without identifying any errors, the backlight signal represented by signal 502 can be asserted only during the time that the display BIST routine is displaying a green color. In particular, the backlight control signal 502 is asserted at time reference 512 and deactivated at time reference 513. Accordingly, the display remains black for the duration of the BIST color sequence except for the period of time between four seconds and six seconds, when the color green will be displayed. Similarly, in order to indicate that the motherboard test procedure identified a failure, the backlight signal represented by signal 503 can be asserted only during the time that the display BIST routine is displaying a red color. In particular, the backlight control signal 503 is asserted at time reference 511 and deactivated at time reference 512. Accordingly, the display remains black for the duration of the BIST color sequence except for the period of time between two seconds and four seconds, when the color red will be displayed.

One of skill will appreciate that another type of display BIST routine can be exploited to provide an indication of a result of a motherboard test procedure. For example, a display backlight can be toggled at a fast rate to indicate a pass condition and toggled at a slow rate to indicate a fail condition. For another example, the backlight can be modulated based on an encoding of the test result or an encoding of error or diagnostic information.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a central processor;
a non-volatile firmware memory to store instructions executable by the central processor;
a video graphics array (VGA) device controller;
a primary display device coupled to an output of the VGA device controller; and
an embedded controller, the embedded controller to:
invoke a test procedure to evaluate functionality of motherboard resources at the information handling system; and
provide an indication of a result of the test procedure at the primary display device using a built in self test function incorporated at the primary display device, the embedded controller to:
initiate the built in self test;
enable a back light at the primary display device at a first time if the result of the test procedure indicates a failure; and
enable the back light at the primary display device at a second time if the result of the test procedure does not indicate the failure.

2. The information handling system of claim 1, wherein the test procedure comprises measuring a temperature at the central processor.

3. The information handling system of claim 1, wherein the test procedure includes validation of static firmware included at a non-volatile firmware memory device.

4. The information handling system of claim 3, wherein validation of the static firmware comprises:
the embedded controller to determine a checksum of initial boot block instructions; and
compare the checksum with a predetermined value stored at the information handling system.

5. The information handling system of claim 4, wherein the predetermined value is stored at the non-volatile firmware memory device.

6. The information handling system of claim 3, wherein validation of the static firmware comprises:
the embedded controller to determine a checksum of primary basic input output system firmware instructions; and
compare the checksum with a predetermined value stored at the information handling system.

7. The information handling system of claim 1, wherein the test procedure comprises:
the embedded controller to set a flag indicating that a next boot of the information handling system is to invoke a motherboard built in self test;
initiate a boot of the information handling system; and
receive an indication of a result of the motherboard built in self test.

8. The information handling system of claim 7, where in the motherboard built in self test is configured to verify operation of devices permanently attached to the motherboard.

9. The information handling system of claim 1, wherein:
enabling the back light at the first time is to display a first color; and
enabling the back light at the second time is to display a second color, the second color different than the first color.

10. A method comprising:
invoking, by an embedded controller at an information handling system, a test procedure to evaluate functionality of motherboard resources at the information handling system; and
providing, by the embedded controller, an indication of a result of the test procedure at a primary display device using a built in self test function incorporated at the primary display device, the primary display coupled to an output of a video graphics array device controller, the providing including:
initiating the built in self test;
enabling a back light at the display at a first time if the result of the test procedure indicates a failure; and
enabling the back light at the primary display device at a second time if the result of the test procedure does not indicate the failure.

11. The method of claim 10, wherein the test procedure comprises measuring a temperature at a primary central processing unit included at the information handling system.

12. The method of claim 10, wherein the test procedure includes validating static firmware included at a non-volatile firmware memory device.

13. The method of claim 12, wherein validation of the static firmware comprises:
determining a checksum of initial boot block instructions; and
comparing the checksum with a predetermined value stored at the information handling system.

14. The method of claim 13, wherein the predetermined value is stored at the non-volatile firmware memory device.

15. The method of claim 12, wherein validation of the static firmware comprises:
determining a checksum of primary basic input output system firmware instructions; and
comparing the checksum with a predetermined value stored at the information handling system.

16. The method of claim 10, wherein the test procedure includes:
setting, by the embedded controller, a flag indicating that a next boot of the information handling system is to invoke a motherboard built in self test;
initiating a boot of the information handling system; and
providing an indication of a result of the motherboard built in self test to the embedded controller.

17. The method of claim 16, where in the motherboard built in self test is configured to verify operation of devices permanently attached to the motherboard.

18. The method of claim 10, wherein:
enabling the back light at the first time is to display a first color; and
enabling the back light at the second time is to display a second color, the second color different than the first color.

19. A method comprising:
invoking, by an embedded controller at an information handling system, a test procedure to evaluate functionality of motherboard resources at the information handling system;
initiating a built in self test function at a primary display device at the information handling system, the primary display coupled to an output of a video graphics array device controller;
enabling a back light at the display at a first time if the result of the test procedure indicates a failure; and
enabling the back light at the display at a second time if the result of the test procedure does not indicate the failure.

20. The method of claim 19, wherein the test procedure comprises:
measuring a temperature at a primary central processing unit included at the information handling system; and
validating static firmware included at a non-volatile firmware memory device.

* * * * *